US011023544B2

(12) United States Patent
Liu (10) Patent No.: US 11,023,544 B2
(45) Date of Patent: Jun. 1, 2021

(54) USER MATCHING METHOD AND APPARATUS

(71) Applicant: TENCENT TECHNOLOGY (SHENZHEN) COMPANY LIMITED, Shenzhen (CN)

(72) Inventor: Qi Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 333 days.

(21) Appl. No.: 15/677,149

(22) Filed: Aug. 15, 2017

(65) Prior Publication Data

US 2018/0011939 A1   Jan. 11, 2018

Related U.S. Application Data

(63) Continuation of application No. PCT/CN2016/079370, filed on Apr. 15, 2016.

(30) Foreign Application Priority Data

Apr. 28, 2015   (CN) .......................... 201510206658.2

(51) Int. Cl.
| | |
|---|---|
| *G06F 16/9535* | (2019.01) |
| *G06F 16/28* | (2019.01) |
| *H04L 29/08* | (2006.01) |
| *H04L 12/58* | (2006.01) |
| *G06Q 10/10* | (2012.01) |

(Continued)

(52) U.S. Cl.
CPC ........ *G06F 16/9535* (2019.01); *G06F 16/285* (2019.01); *G06Q 10/10* (2013.01);
(Continued)

(58) Field of Classification Search
CPC .. G06Q 50/01; G06Q 30/0269; G06Q 20/384; G06F 16/9535; G06F 3/0484;
(Continued)

(56) References Cited

U.S. PATENT DOCUMENTS

| | | | |
|---|---|---|---|
| 2004/0046656 A1* | 3/2004 | Schaefer .................. | G08B 1/08 340/539.11 |
| 2011/0106719 A1* | 5/2011 | Wang ..................... | G06Q 50/01 705/319 |

(Continued)

FOREIGN PATENT DOCUMENTS

| | | |
|---|---|---|
| CN | 101847226 A | 9/2010 |
| CN | 103139044 A | 6/2013 |
| CN | 103914499 A | 7/2014 |

OTHER PUBLICATIONS

Search Report in International Application No. PCT/CN2016/079370 dated Jun. 30, 2016, 4 pages.

(Continued)

*Primary Examiner* — Boris Gorney
*Assistant Examiner* — Bao G Tran
(74) *Attorney, Agent, or Firm* — Anova Law Group, PLLC (57) ABSTRACT

An embodiment of the present application provides a user matching method, which includes: receiving first personal information sent by a current user; generating a first candidate peer information list according to the first personal information and providing the first candidate peer information list to the current user for selection; receiving at least one piece of first peer information selected by the current user from the first candidate peer information list; searching for a recommended user according to an information peer exchange principle, wherein the information peer exchange principle comprises that personal information of the recommended user matches with the at least one piece of first peer information selected by the current user, and the first personal information matches with at least one piece of first peer information selected by the recommended user; and (Continued)

providing information of the recommended user to the current user. A user matching apparatus is also provided.

17 Claims, 5 Drawing Sheets

(51) Int. Cl.
    *H04L 29/06*     (2006.01)

(52) U.S. Cl.
    CPC .............. *H04L 51/14* (2013.01); *H04L 51/32* (2013.01); *H04L 67/1082* (2013.01); *H04L 67/306* (2013.01); *H04L 67/10* (2013.01); *H04L 67/42* (2013.01)

(58) Field of Classification Search
    CPC ...... G06F 16/29; G06F 21/32; G06F 21/6245; H04L 67/306
    See application file for complete search history.

(56) References Cited

U.S. PATENT DOCUMENTS

| | | | |
|---|---|---|---|
| 2012/0089679 A1* | 4/2012 | Gold | H04L 63/168 709/204 |
| 2012/0226701 A1* | 9/2012 | Singh | G06F 21/40 707/748 |
| 2014/0074939 A1 | 3/2014 | Zhang | |
| 2014/0100985 A1 | 4/2014 | Lenahan et al. | |

OTHER PUBLICATIONS

International Preliminary Report on Patentability and Written Opinion in International Application No. PCT/CN2016/079370 dated Oct. 31, 2017, 7 pages.

* cited by examiner

USER MATCHING METHOD AND APPARATUS

This application is a continuation of International Application No. PCT/CN2016/079370 filed Apr. 15, 2016, which claims the benefit of and priority to Chinese Patent Application No. 2015/10206658.2 filed Apr. 28, 2015, by Tencent Technology (Shenzhen) Co., Ltd. and entitled "User Matching Method and Apparatus", the entire respective disclosures of which are incorporated herein by reference.

TECHNICAL FIELD

The present application relates to communication technologies, and more particularly to a user matching method and apparatus.

BACKGROUND

With the rapid development of communication technology and Internet technology, various terminal devices such as personal computers, notebook computers, tablets and mobile phones become important tools for obtaining information and communication. For example, a user may install social software such as QQ, WeChat, Momo and Douban in a terminal device, meet friends through the social software, and further communicate with the friends.

At present, the social software usually adopts three user matching methods, which include a Location-Based Services (LBS) matching method, a user interest matching method and a random matching method. The LBS matching method may be used for searching for people around, for example, a "Look Around" function. When enabling the "Look Around" function, a user may see other users using this function recently around, thereby implementing the time-based and location-based matching method. The user interest matching method may be used in a city activity or a circle of people with the same interest. The random matching method may recommend an interesting person for the user randomly each time.

SUMMARY

Embodiments of the present application provide a user matching method and apparatus, by which the accuracy degree of user matching performed by a device can be improved.

An embodiment of the present application provides a user matching method, including:

receiving, by a server, first personal information of a current user from a first terminal device;

generating, by the server, a first candidate peer information list according to the first personal information and sending the first candidate peer information list to the first terminal device;

receiving, by the server from the first terminal device, at least one piece of first peer information selected by the current user from the first candidate peer information list;

searching, by the server, for a recommended user according to an information peer exchange principle, wherein the information peer exchange principle comprises that personal information of the recommended user matches with the at least one piece of first peer information selected by the current user, and the first personal information matches with at least one piece of first peer information selected by the recommended user; and sending, by the server, information of the recommended user to the first terminal device.

An embodiment of the present application provides a user matching apparatus, which runs in a server and includes: a processor and a non-transitory storage, wherein the non-transitory storage stores one or more computer readable instructions, and the processor executes the computer readable instructions stored in the non-transitory storage to a receiving module, configured to receive first personal information sent by a current user and at least one piece of first peer information selected by the current user from a first candidate peer information list;

receive first personal information of a current user from a first terminal device;

generate a first candidate peer information list according to the first personal information and send the first candidate peer information list to the first terminal device;

receive, from the first terminal device, at least one piece of first peer information selected by the current user from the first candidate peer information list;

search for a recommended user according to an information peer exchange principle, wherein the information peer exchange principle comprises that personal information of the recommended user matches with the at least one piece of first peer information selected by the current user, and the first personal information matches with at least one piece of first peer information selected by the recommended user; and send information of the recommended user to the first terminal device.

An embodiment of the present application provides a non-transitory computer readable storage medium for storing programs, which are executed by a computer to implement the above user matching method.

By the user matching method and apparatus provided by the embodiments of the present application, the user may select at least one piece of peer information from the candidate peer information list after providing one piece of personal information, so as to acquaint with a to-be-communicated object. The server may provide the recommended user list to the user according to the peer information provided by the user, so as to meet the more specific and accurate communication demands of the user. It is not required that the personal information provided by the user and the peer information selected by the user are identical. For example, the personal information provided by the user may be age information, but the peer information selected by the user may be other information such as residence information or interest information, instead of the age information. Accordingly, the user matching method and apparatus provided by the embodiments of the present application fully consider the demands for difference between users, and thus the users may easily find mutual interests. By the user matching method and apparatus provided by the embodiments of the present application, the user can obtain a better choice and identification capability when selecting a to-be-communicated object. Further, in the user matching method and apparatus provided by the embodiments of the present application, a satisfied user is searched for according to an information peer exchange principle and is determined as a recommended user. One piece of information of the current user may exchange for one piece of information of the recommended user, so as to implement fair information exchange between users, protect the privacy of the users to some degree, and establish effective communication and trust.

In order to make the above and other objects, features and merits of the present application clearer, the present application will be illustrated in detail hereinafter with reference to embodiments and the accompanying drawings.

DETAILED DESCRIPTION

In order to illustrate the technical solution and merits of the present application to implement the predefined object, the specific implements, structures, features and merits of the present application will be illustrated in detail hereinafter with reference to the accompanying drawings and embodiments.

A user matching method and apparatus provided by the embodiments of the present application are applicable to a user information management system. The user information management system may, but is not limited to, provide services for a social platform. The user information management system may be a background management server for performing user information storage, related information recommendation, user matching recommendation and user information evaluation. The social platform includes, but is not limited to, QQ, WeChat, Momo and so on. Through connecting a terminal device with the user information management system, a user may search for a to-be-communicated object through the user information management system.

Figure 1:
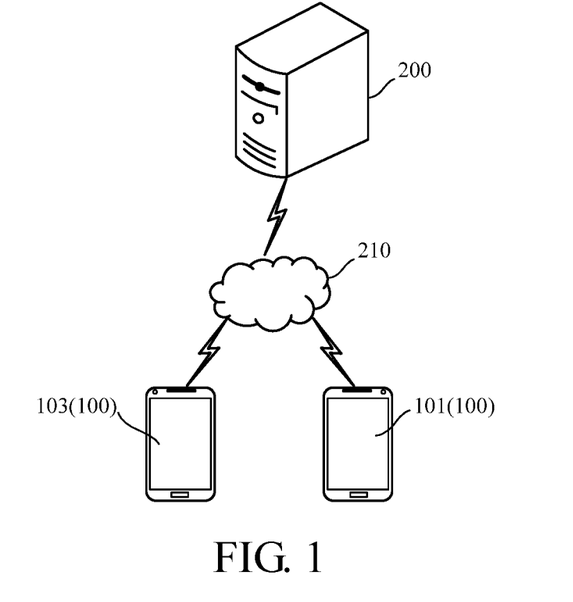
FIG. 1 is a diagram illustrating an application environment of a user matching method and apparatus according to an embodiment of the present application.

FIG. 1 is a diagram illustrating an application environment of a user matching method and apparatus according to an embodiment of the present application. As shown in FIG. 1, multiple terminal devices 100 communicate with a server 200 via a network 210. The terminal devices 100 may be various electronic devices, such as personal computers, notebook computers, tablets and mobile phones. A client of a social platform is installed in the terminal devices 100. The server 200 is a background management server of the social platform, and may provide various services for the client. The network 210 may be, but is not limited to, Internet, Intranet, a local area network, a mobile communication network and combination thereof. In the embodiment shown in FIG. 1, the multiple terminal devices 100 include a first terminal device 101 and a second terminal device 103 which belong to two users respectively.

Figure 2:
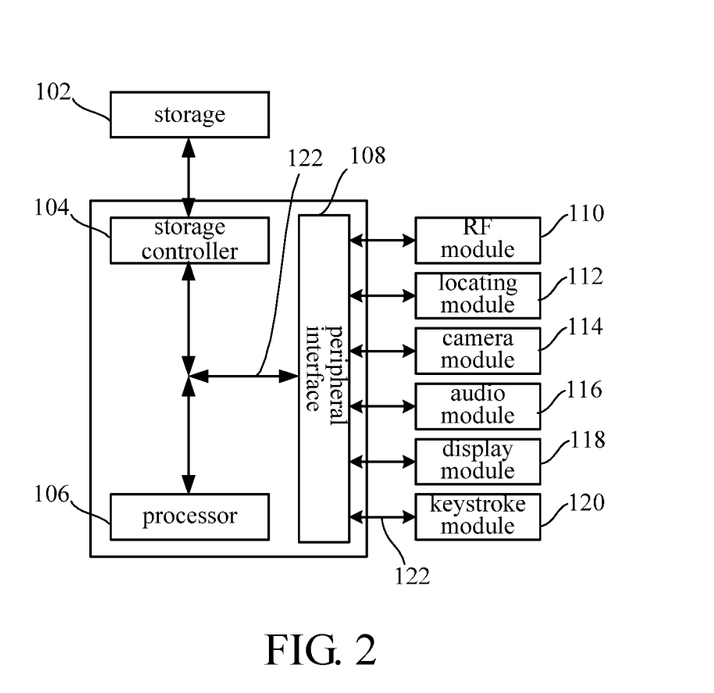
FIG. 2 is a diagram illustrating the structure of a terminal device shown in FIG. 1 according to an embodiment of the present application.

FIG. 2 is a diagram illustrating the structure of the terminal device 100 according to an embodiment of the present application. As shown in FIG. 2, the terminal device 100 includes a storage 102, a storage controller 104, one or more (only one is shown in FIG. 2) processors 106, a peripheral interface 108, a Radio Frequency (RF) module 110, a locating module 112, a camera module 114, an audio module 116, a display module 118 and a keystroke module 120. These components communicate with each other via one or more communication buses/signal lines 122.

It can be understood that the structure shown in FIG. 2 is schematic, and the terminal device 100 may include more or less components than that shown in FIG. 2, or may have a configuration different from that shown in FIG. 2. The components shown in FIG. 2 may be implemented by hardware, software or combination thereof.

The storage 102 may store software programs and modules, for example, program instructions/modules corresponding to the user matching method and apparatus provided by the embodiments of the present application. The processor 106 may implement various function applications and data processing through executing the software programs and modules stored in the storage 102.

The storage 102 may include a high-speed random access memory, and may further include a non-transitory storage, such as one or more magnetism storage devices, flash memories or other non-transitory solid state storages. In some examples, the storage 102 may further include remote storages relative to the processor 106, which may be connected with the terminal device 100 via networks. The networks include, but are not limited to Internet, Intranet, a local area network, a mobile communication network and combination thereof. The access of the processor 106 and other possible components to the storage 102 may be performed under the control of the storage controller 104.

The peripheral interface 108 couples various input/output devices to the processor 106 and the storage 102. The processor 106 executes various software and instructions stored in the storage 102 to implement various functions and data processing of the terminal device 100.

In some examples, the peripheral interface 108, the processor 106 and the storage 102 may be implemented by a single chip, but in other embodiments, they may be implemented by different chips respectively.

The RF module 110 may receive and send electromagnetic waves, and implement the conversion between the electromagnetic waves and electronic signals, so as to communicate with a communication network or other devices. The RF module 110 may include various circuit components for executing these functions, for example, an antenna, an RF transceiver, a digital signal processor, an encryption/decryption chip, a Subscriber Identity Module (SIM) card, a storage and so on. The RF module 110 may communicate with various networks such as Internet, Intranet and a wireless network, or communicate with other devices via the wireless network. The wireless network may include a cellular telephone network, a local area network or a metropolitan area network. The wireless network may adopt various communication standards, protocols and technologies, which include, but are not limited to, Global System for Mobile Communication (GSM), Enhanced Data GSM Environment (EDGE), wideband code division multiple access (W-CDMA), Code division access (CDMA), time division multiple access (TDMA), bluetooth, Wireless Fidelity (WiFi) (for example, Institute of Electrical and Electronics Engineers (IEEE) 802.11a, IEEE 802.11b, IEEE 802.11g and/or IEEE 802.11n), Voice over internet protocol (VoIP), Worldwide Interoperability for Microwave Access (WiMax), other protocols for mails, instant messaging and short messages, and any other applicable communication protocol, even include undeveloped protocols.

The locating module 112 may obtain the current location of the terminal device 100. The locating module 112 includes, but is not limited to, Global Positioning System (GPS) and location technology based on a wireless local network or a mobile communication network.

The camera module 114 may take pictures or shoot videos. The pictures or videos may be stored in the storage 102, and may be sent via the RF module 110.

The audio module 116 may provide an audio interface to the user, and may include one or more microphones, one or more speakers and an audio circuit. The audio circuit receives sound data from the peripheral interface 108, converts the sound data into electronic signals, and sends the electronic signals to the speakers. The speakers convert the electronic signals into sound waves which can be heard by people. The audio circuit further receives electronic signals from the microphones, convert the electronic signals into sound data, and send the sound data to the peripheral interface 108 to be further processed. Audio data may be obtained from the storage 102 or via the RF module 110. Besides, the audio data may be stored in the storage 102 or sent via the RF module 110. In some examples, the audio module 116 may further include an earphone jack, which may provide an audio interface for the earphone or other devices.

The display module 118 may provide an output interface between the terminal device 100 and the user. Specifically, the display module 118 displays video output for the user, and the contents of the video output may include characters, graphics, videos and combination thereof. Some output results correspond to some user interface objects. Further, the display module 118 may also provide an input interface between the terminal device 100 and the user, which may receive user input, for example, gesture operations such as a clicking operation and a gliding operation of the user, so that user interface objects may respond to the user input. A technology for detecting user input may be a touch detection technology based on resistance type, capacitance type or any other possible type. In some examples, the display module 118 includes, but is not limited to, a liquid crystal display or a luminescent polymer display.

The keystroke module 120 may also provide an interface for user input to the terminal device 100, and the user may press different keystrokes to make the terminal device 100 execute different functions.

Figure 3:
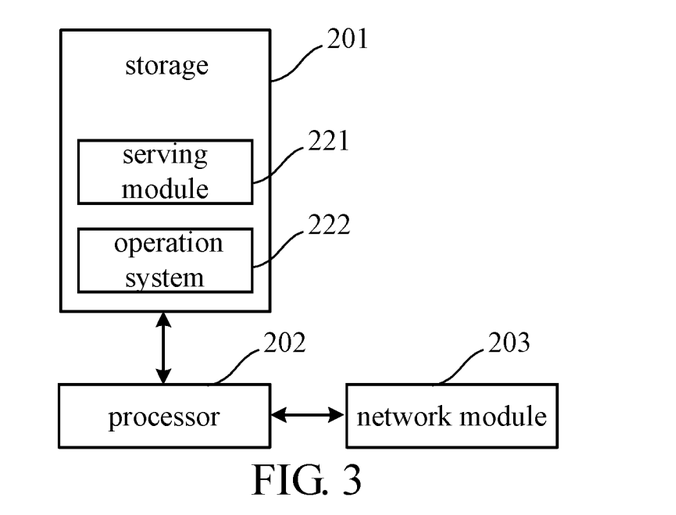
FIG. 3 is a diagram illustrating the structure of a server shown in FIG. 1 according to an embodiment of the present application.

FIG. 3 is a diagram illustrating the structure of the server 200 according to an embodiment of the present application. As shown in FIG. 3, the server 200 includes a storage 201, a processor 202 and a network module 203.

It can be understood that the structure shown in FIG. 3 is schematic, and the server 200 may include more or less components than that shown in FIG. 3, or may have a configuration different from that shown in FIG. 3. The components shown in FIG. 3 may be implemented by hardware, software or combination thereof. In addition, the server provided by the embodiment of the present application may further include multiple servers with different functions.

The storage 201 may store software programs and modules, for example, program instructions/modules corresponding to the user matching method and apparatus provided by the embodiments of the present application. The processor 202 may implement various function applications and data processing through executing the software programs and modules stored in the storage 201, i.e., implement the user matching method and apparatus provided by the embodiments of the present application. The storage 201 may include a high-speed random access memory, and may further include a non-transitory storage, such as one or more magnetism storage devices, flash memories or other non-transitory solid state storages. In some examples, the storage 201 may further include remote storages relative to the processor 202, which may be connected with the server 200 via networks. Further, the software programs and modules may further include a serving module 221 and an operation system 222. The operation system 222 may be, for example, LINUX, UNIX and WINDOWS. The operation system may include various software components and/or drivers for managing system tasks (for example, memory management, storage device control and power supply management and so on), and may communicate with various hardware or software components, so as to provide an operation environment for other software components. The serving module 221 runs on the operation system 222, monitors requests from networks by means of network services of the operation system 222, performs data processing according to the requests, and returns processing results to a client. That is, the serving module 221 may provide network services to the client.

The network module 203 may receive and send network signals. The network signals may include wireless signals or wire signals. In an embodiment, the network signals are wire signals. In this case, the network module 203 may include a processor, a random access memory, a converter and a crystal oscillator.

The user matching method and apparatus will be illustrated in detail hereinafter with reference to some embodiments.

Figure 4:
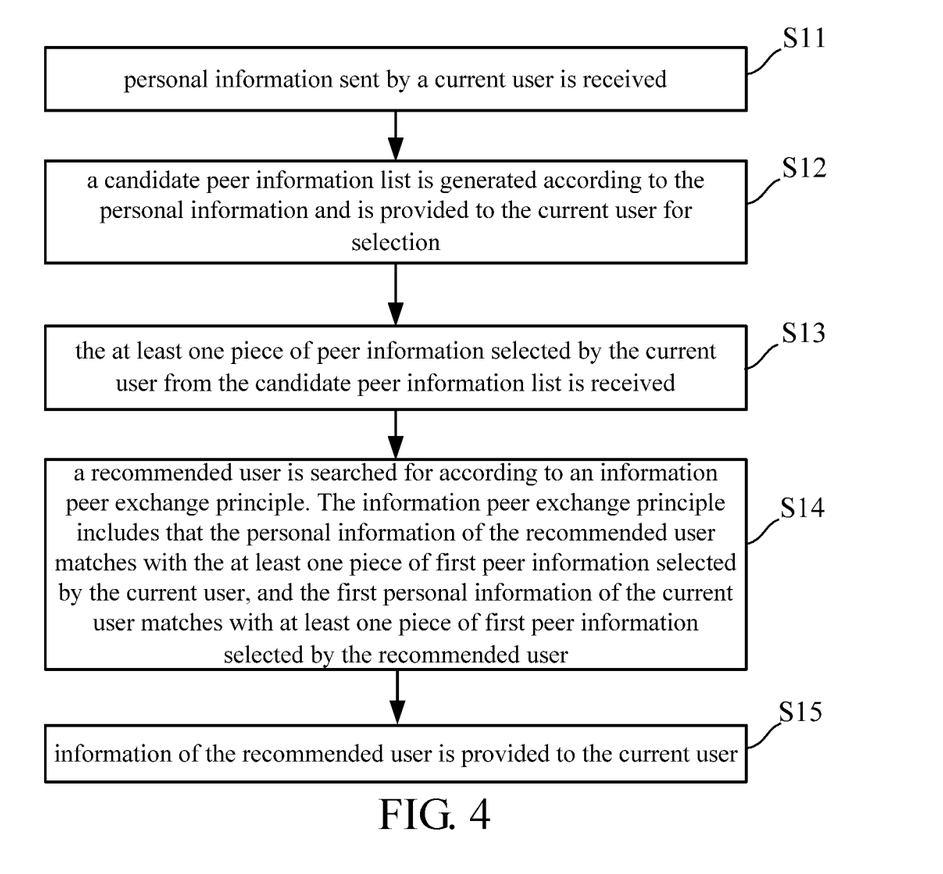
FIG. 4 is a flowchart illustrating a user matching method according to an embodiment of the present application.

An embodiment of the present application provides a user matching method, which can be implemented by the server 200 shown in FIG. 1. FIG. 4 is a flowchart illustrating the user matching method. Referring to FIG. 4, the user matching method provide by this embodiment includes following blocks.

At block S11, personal information sent by a current user is received.

In an embodiment of this block, the current user may send the personal information to the server 200 via a first terminal device 101.

The personal information includes, but is not limited to, physical information, age information, work information, family information, residence information and interest information.

The current user may edit the contents of the personal information through the first terminal device 101, for example, edit "I live in Shanghai", and submit the personal information to the server 200 in a form of characters. In addition, the current user may record a paragraph for describing the personal information through the first terminal device 101, and submit the personal information to the server 200 in a form of voice. In addition, the current user may take a photo of or shoot a fond article or residence environment, show the personal information through the photo or the image, and submit the personal information to the server 200 in a form of video. The server 200 receives the personal information.

At block S12, a candidate peer information list is generated according to the personal information and is provided to the current user for selection.

In an embodiment of this block, when receiving the personal information, the server 200 analyzes the personal information and generates the candidate peer information list according to the personal information. The candidate peer information list records one or more pieces of candidate peer information. In an embodiment of the present application, comparing with the personal information of the current user, the peer information refers to the category of the personal information of an object to be acquainted by the current user. In an embodiment, the candidate peer information may include, but is not limited to, physical information, age information, work information, family information, residence information and interest information.

After generating the candidate peer information list, the server 200 sends the candidate peer information list to the first terminal device 101 of the current user. The first terminal device 101 displays the candidate peer information list through a display screen for the current user, so that the current user may select the peer information of the to-be-communicated object.

The current user may select at least one piece of peer information from the candidate peer information list. In order to conveniently perform a subsequent matching process by the server 200, the number of pieces of peer information selected by the current user may be limited to N at most, for example, 2, 3 or 4, and the value of N may be determined according to actual applications.

At block S13, the at least one piece of peer information selected by the current user from the candidate peer information list is received.

In an embodiment of this block, after the current user selects the peer information of the to-be-communicated object, the first terminal device 101 sends the at least one piece of peer information selected by the current user to the server 200. The server 200 receives the at least one piece of peer information.

At block S14, a recommended user is searched for according to an information peer exchange principle. The information peer exchange principle includes that the personal information of the recommended user matches with the at least one piece of peer information selected by the current user, and the personal information of the current user matches with at least one piece of peer information selected by the recommended user.

In an embodiment of the present application, the recommended user refers to a user that meets the information peer exchange principle and may be recommended to the current user. The personal information of the recommended user may be stored in the storage of the server 200 in advance. Every time the server 200 receives personal information sent by a user, the server 200 may store the received personal information into the storage.

In an embodiment of the present application, the server 200 may generate a recommended user list according to found recommend users.

In an embodiment of this block, when receiving the at least one piece of peer information selected from the candidate peer information list by the current user, the server 200 searches for the recommended user according to the information peer exchange principle, and generates the recommended user list.

In an embodiment of the present application, according to the information peer exchange principle, the current user provides one piece of personal information and selects at least one piece of peer information of a to-be-communicated object. The server 200 searches for a suitable user according to the personal information and the peer information provided by the current user, and recommends the found user to the current user. The recommended user meets a condition that the personal information of the recommended user matches with the at least one piece of peer information selected by the current user, and at least one piece of peer information selected by the recommended user matches with the personal information of the current user.

For example, the personal information submitted by the current user is "I live in Shanghai" and the peer information selected by the current user is "age information". If the server 200 finds that the personal information provided by a user is "I'm 28 years old" and the peer information selected by the user is "residence information", the server 200 determines that the user is a recommended user, and adds the user to the recommended user list.

For another example, the personal information submitted by the current user is "I live in Shanghai" and two pieces of peer information selected by the current user is "age information" and "interest information". If the server 200 finds that the personal information provided by a user A is "I'm 28 years old" and the peer information selected by the user A is "residence information", the server 200 determines that the user A is a recommended user, and adds the user A to the recommended user list. If the server 200 finds that the personal information provided by a user B is "I like karaoke" and the peer information selected by the user B is "residence information" or "work information", the server 200 determines that the user B is a recommended user, and adds the user B to the recommended user list. If the server 200 finds that the personal information provided by a user C is "I like karaoke" and "I'm 18 years old" and a piece of peer information selected by the user C is "residence information", the server 200 determines that the user C is a recommended user, and adds the user C to the recommended user list.

At block S15, information of the recommended user is provided to the current user.

In an embodiment of this block, after finding all recommended users and generating the recommended user list, the server 200 provides the recommended user list to the current user.

After receiving the recommended user list, the current user may view the personal information of the recommended user in the recommended user list. The personal information of the recommended user corresponds to one of the at least one piece of peer information selected by the current user.

In an embodiment of the present application, the information peer information exchange principle further includes a one-to-one information exchange principle. If multiple pieces of personal information provided by the recommended user match with multiple pieces of peer information selected by the current user, according to the information peer exchange principle, the current user can only select and view one of the multiple pieces of personal information provided by the recommended user. For example, the current user can only select and view one of interest information and age information provided by the user C.

As can be seen, by the user matching method provided by the embodiment of the present application, the user may select at least one piece of peer information from the candidate peer information list after providing one piece of personal information, so as to acquaint with a to-be-communicated object. The server may provide the recommended user list to the user according to the peer information provided by the user, so as to meet the more specific and accurate communication demands of the user.

In the embodiment of the present application, it is not required that the personal information provided by the user and the peer information selected by the user are identical. For example, the personal information provided by the user may be age information, but the peer information selected by the user may be other information such as residence information or interest information, instead of the age information. Accordingly, the user matching method provided by the embodiment of the present application fully considers the demands for difference between users, and thus the users may easily find mutual interests. By the user matching method provided by the embodiment of the present application, the user can obtain a better choice and identification capability when selecting a to-be-communicated object.

Further, in the user matching method provided by the embodiment of the present application, according to the information peer interchange principle, one piece of information of the current user may exchange for one piece of information of the recommended user, so as to implement fair information exchange between users, protect the privacy of the users to some degree, and establish effective communication and trust.

Figure 5:
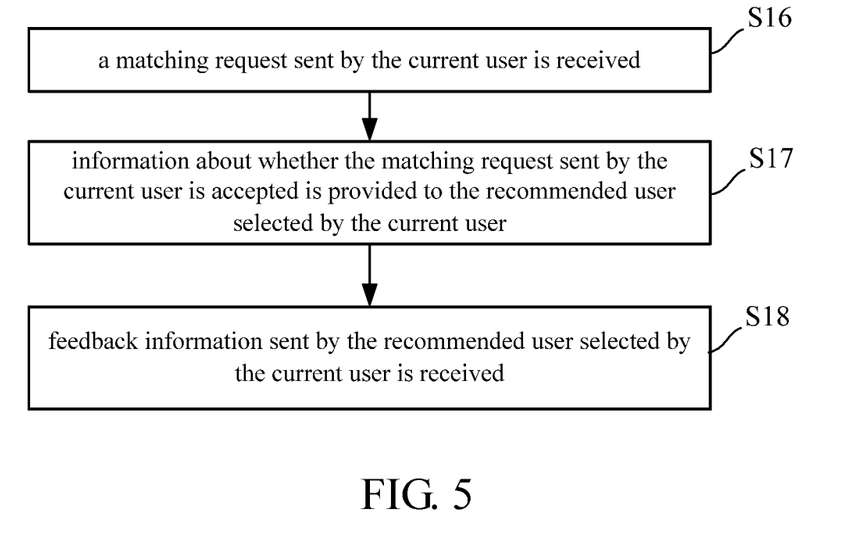
FIG. 5 is a flowchart illustrating additional blocks of the user matching method according to an embodiment of the present application.

After the above blocks are performed, referring to FIG. 5, the method may further include following blocks, so as to implement matching between the current user and the recommended user.

At block S16, a matching request sent by the current user is received.

In an embodiment of this block, after selecting a to-be-matched (for example, adding a friend and following) recommended user from the recommended user list, the current user sends a matching request to the server 200. The matching request includes information of the recommended user selected from the recommended user list by the current user. The current user may select at least one recommended user to perform a matching operation. The server 200 receives the matching request sent by the current user.

At block S17, information about whether the matching request sent by the current user is accepted is provided to the recommended user selected by the current user.

In in an embodiment of this block, after receiving the matching request sent by the current user, the server 200 provides the information about whether the matching request sent by the current user is accepted to the recommended user selected by the current user.

At block S18, feedback information sent by the recommended user selected by the current user is received.

In an embodiment of this block, the server 200 receives the feedback information that is sent by the recommended user selected by the current user via a second terminal device 103 shown in FIG. 1. The feedback information includes information indicating to accept or not to accept the matching request sent by the current user. For example, if the recommended user selected by the current user approves the matching operation, the feedback information indicates to accept the matching request sent by the current user; otherwise, the feedback information indicates not to accept the matching request sent by the current user.

If the feedback information that is sent by the recommended user selected by the current user indicates to accept the matching request sent by the current user, the server 200 performs the matching operation between the current user and the recommended user.

Besides, the feedback information may further include evaluation information performed on the personal information of the current user by at least one recommended user among the recommended users selected by the current user. The evaluation information may be an evaluation performed on truth of the contents of the personal information provided by the current user. After receiving the evaluation information, the server 200 may take the evaluation information as a factor for determining a recommendation level of the current user. For example, when the current user is recommended to other users by the server 200, the current user is more likely to appear high in the recommended user list if the truth degree of the personal information provided by the current user is higher in the evaluation information provided by the recommended user and the number of recommended users evaluating the personal information as truth is larger.

Figure 6:
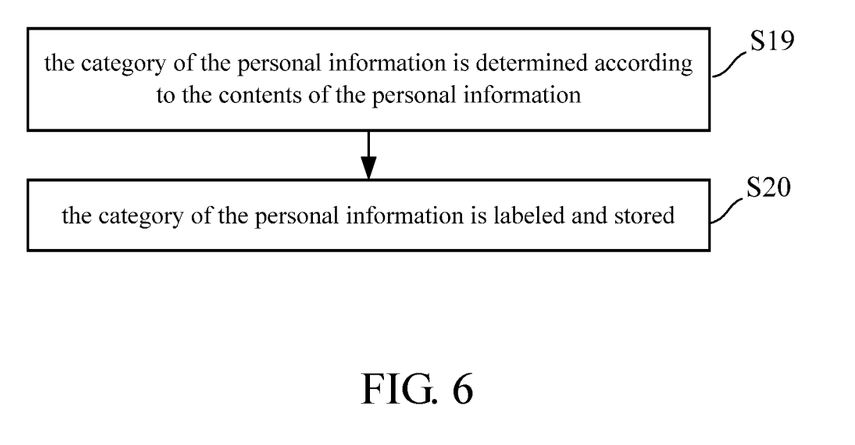
FIG. 6 is a flowchart illustrating additional blocks of the user matching method according to an embodiment of the present application.

Referring to FIG. 6, in this embodiment, after the server 200 receives the personal information sent by the current user, the method may further include following blocks.

At block S19, the category of the personal information is determined according to the contents of the personal information.

In an embodiment of this block, when receiving and analyzing the personal information of the current user, the server 200 may further determine the category of the personal information according to the contents of the personal information. For example, if the contents of the personal information are "I live in Shanghai", the server 200 determines that the category of the personal information is residence information. If the contents of the personal information are "I am 18 years old", the server 200 determines that the category of the personal information is age information.

At block S20, the category of the personal information is labeled and stored.

In an embodiment of this block, after determining the category of the personal information provided by the current user, the server 200 labels and stores the category of the personal information. In this way, when searching for a to-be-communicated object, another user may determine rapidly whether the current user may be taken as a recommended user according to the peer information selected by the user and the category of the personal information provided by the current user. For example, the personal information provided by the current user is "I am 18 years old", and the server 200 determines that the personal information is age information, and labels and stores the category of the personal information. When another user searches for a to-be-communicated object and the peer information selected by the user includes age information, the server 200 may rapidly find the current user according to the labeled and stored category of the personal information, and further determine whether the current user may be taken as the recommended user. In this way, the server 200 may save time and determination programs for searching for the recommended user.

Figure 7:
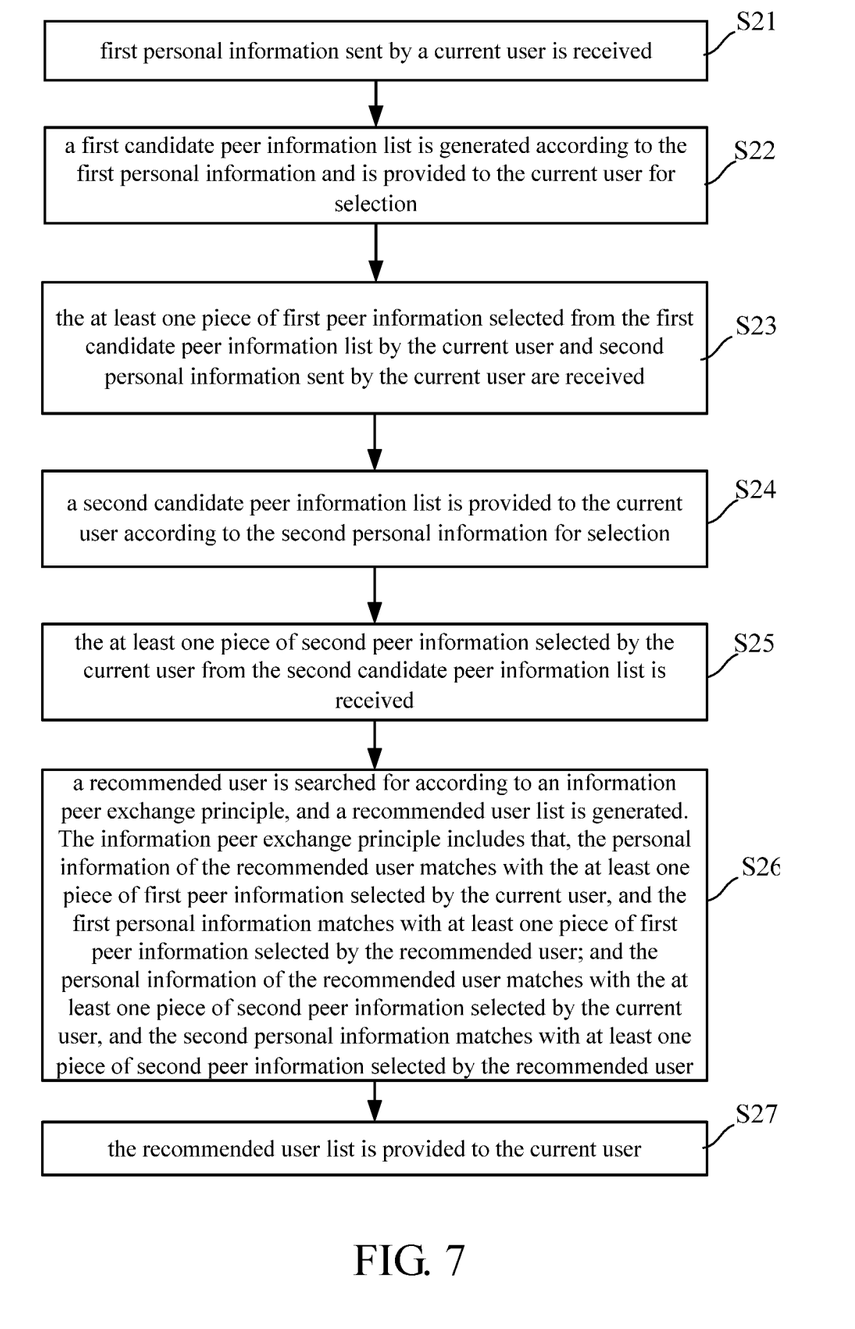
FIG. 7 is a flowchart illustrating another user matching method according to an embodiment of the present application.

An embodiment of the present application provides another user matching method, which can be implemented by the server 200 shown in FIG. 1. FIG. 7 is a flowchart illustrating the user matching method. Referring to FIG. 7, the method includes following blocks.

At block S21, first personal information sent by a current user is received.

In an embodiment of this block, the current user may send the first personal information to the server 200 via a first terminal device 101.

The first personal information includes, but is not limited to, physical information, age information, work information, family information, residence information and interest information.

The current user may edit the contents of the first personal information through the first terminal device 101, for example, edit "I live in Shanghai", and submit the first personal information to the server 200 in a form of characters. In addition, the current user may record a paragraph for describing the first personal information through the first terminal device 101, and submit the first personal information to the server 200 in a form of voice. In addition, the current user may take a photo of or shoot a fond article or residence environment, show the first personal information through the photo or the image, and submit the first personal information to the server 200 in a form of video. The server 200 receives the first personal information.

At block S22, a first candidate peer information list is generated according to the first personal information and is provided to the current user for selection.

In an embodiment of this block, when receiving the first personal information, the server 200 analyzes the first personal information and generates the first candidate peer information list according to the first personal information. The candidate peer information in the first candidate peer information list may include, but is not limited to, physical information, age information, work information, family information, residence information and interest information.

After generating the first candidate peer information list, the server 200 sends the first candidate peer information list to the first terminal device 101 of the current user. The first terminal device 101 displays the first candidate peer information list through a display screen for the current user, so that the current user may select the first peer information of the to-be-communicated object.

The current user may select at least one piece of first peer information from the first candidate peer information list. In order to conveniently perform a subsequent matching process by the server 200, the number of pieces of first peer information selected by the current user may be limited to N at most, for example, 2, 3 or 4, and the value of N may be determined according to actual applications.

If the current user intends to provide another piece of personal information, the current user may edit second personal information, which is different from the first personal information.

At block S23, the at least one piece of first peer information selected from the first candidate peer information list by the current user and second personal information sent by the current user are received.

In an embodiment of this block, after the current user selects the first peer information of the to-be-communicated object, the first terminal device 101 sends the at least one piece of first peer information selected by the current user and the second personal information to the server 200. The server 200 receives the at least one piece of first peer information selected by the current user and the second personal information.

At block S24, a second candidate peer information list is provided to the current user according to the second personal information for selection.

In an embodiment of this block, after receiving the second personal information, the server 200 analyzes the second personal information and generates the second candidate peer information list according to the second personal information. The candidate peer information in the second candidate peer information list may include, but is not limited to, physical information, age information, work information, family information, residence information and interest information.

After generating the second candidate peer information list, the server 200 sends the second candidate peer information list to the first terminal device 101 of the current user. The first terminal device 101 displays the second candidate peer information list for the current user through the display screen, so that the current user may select the second peer information of the to-be-communicated object.

The candidate peer information provided by the second candidate peer information list may be the same as or different from that provided by the first candidate peer information list. Similarly, the current user may select at least one piece of second peer information from the second candidate peer information list. The at least one piece of second peer information and the at least one piece of first peer information selected from the first candidate peer information list by the current user may be the same, overlap or different from each other. In order to conveniently perform a subsequent matching process by the server 200, the number of pieces of second peer information selected by the current user may be limited to N at most, for example, 2, 3 or 4, and the value of N may be determined according to actual applications.

At block S25, the at least one piece of second peer information selected by the current user from the second candidate peer information list is received.

In an embodiment of this block, after the current user selects the second peer information of the to-be-communicated object, the first terminal device 101 sends the at least one piece of second peer information selected by the current user to the server 200. The server 200 receives the at least one piece of second peer information selected by the current user from the second candidate peer information list.

It should be understood that, the current user may send multiple pieces of personal information to the server 200. Every time the server 200 receives one piece of personal information sent by the current user, the server 200 provides a candidate peer information list to the current user, so that the current user may select at least one piece of peer information corresponding to the personal information.

At block S26, a recommended user is searched for according to an information peer exchange principle, and a recommended user list is generated. The information peer exchange principle includes that, the personal information of the recommended user matches with the at least one piece of first peer information selected by the current user, and the first personal information matches with at least one piece of first peer information selected by the recommended user; and the personal information of the recommended user matches with the at least one piece of second peer information selected by the current user, and the second personal information matches with at least one piece of second peer information selected by the recommended user.

In an embodiment of this block, when receiving the at least one piece of first peer information selected by the current user from the first candidate peer information list and the at least one piece of second peer information selected by the current user from the second candidate peer information list, the server 200 searches for the recommended user according to the information peer exchange principle, and generates the recommended user list.

According to the firs personal information and the second personal information provided by the current user and the information peer exchange principle, the personal information of the recommended user matches with the at least one piece of first peer information selected by the current user, and the first personal information of the current user matches with the at least one piece of first peer information selected by the recommended user; at the same time, the personal information of the recommended user matches with the at least one piece of second peer information selected by the current user, and the second personal information of the current user matches with the at least one piece of second peer information selected by the recommended user.

For example, if the current user provides first personal information x and second personal information u respectively, selects two pieces of first peer information y and z for the first personal information x, and selects two pieces of second peer information v and w for the second personal information u. The x, y, z, u, v and w may be, but are not limited to, physical information, age information, work information, family information, residence information and interest information.

If the server 200 finds that the first personal information provided by the user includes y or z, the first peer information selected by the user includes x, the second personal information provided by the user includes v or w and the second peer information selected by the user includes u, the server 200 determines that the user is a recommended user, and adds the user to the recommended user list. That is, four categories of users may be taken as recommended users. The first personal information provided by a first category of users includes y, the first peer information selected by the first category of users includes x, the second personal information provided by the first category of users incudes v, and the second peer information selected by the first category of users includes u. The first personal information provided by a second category of users includes y, the first peer information selected by the second category of users includes x, the second personal information provided by the second category of users incudes w, and the second peer information selected by the second category of users includes u. The first personal information provided by a third category of users includes z, the first peer information selected by the third category of users includes x, the second personal information provided by the third category of users incudes v, and the second peer information selected by the third category of users includes u. The first personal information provided by a fourth category of users includes z, the first peer information selected by the fourth category of users includes x, the second personal information provided by the fourth category of users incudes w, and the second peer information selected by the fourth category of users includes u.

For another example, if the user provides first personal information x and second personal information u respectively, selects two pieces of first peer information y and z for the first personal information x, and selects two pieces of second peer information y and v for the second personal information u. That is, one piece of second peer information is the same as one piece of first peer information.

If the server 200 finds that the first personal information provided by the user includes y or z, the first peer information selected by the user includes x, the second personal information provided by the user includes y or v, and the second peer information selected by the user includes u, the server 200 determines that the user is a recommended user, and adds the user to the recommended user list. If it is required that the first personal information provided by the user cannot be the same as the second personal information, three categories of users may be taken as recommended users. The first personal information provided by a first category of users includes y, the first peer information selected by the first category of users includes x, the second personal information provided by the first category of users incudes v, and the second peer information selected by the first category of users includes u. The first personal information provided by a second category of users includes z, the first peer information selected by the second category of users includes x, the second personal information provided by the second category of users incudes y, and the second peer information selected by the second category of users includes u. The first personal information provided by a third category of users includes z, the first peer information selected by the third category of users includes x, the second personal information provided by the third category of users incudes v, and the second peer information selected by the third category of users includes u.

At block S27, the recommended user list is provided to the current user.

In an embodiment of this block, after finding all recommended users and generating the recommended user list, the server 200 provides the recommended user list to the current user.

After receiving the recommended user list, the current user may view the personal information of the recommended users in the recommended user list.

It should be noted that, according to the information peer exchange principle, because the current user provides the first personal information and the second personal information, the current user may view two pieces of personal information provided by the recommended users, which correspond to the first peer information and the second peer information selected by the current user respectively. Even if multiple pieces of personal information provided by the recommended users match with multiple pieces of first peer information or second peer information selected by the current user, the current user can only select one of the multiple pieces of personal information provided by the recommended users. For example, the current user provides the first personal information x, selects two pieces of first peer information y and z for the first personal information x, provides the second personal information u, and selects two pieces of second peer information v and w for the second personal information u. The recommended user provides personal information y, z and v, selects the peer information x for the personal information y, selects the peer information x for the personal information z, and selects the peer information u for the personal information v. Accordingly, the current user can only select one of the two pieces of personal information y and z provided by the recommended user.

As can be seen, by the user matching method provided by the embodiment of the present application, the user may select at least one piece of peer information from multiple candidate peer information lists after providing multiple pieces of personal information respectively, so as to acquaint with a to-be-communicated object. The server may provide the recommended user lists to the user according to the peer information provided by the user, so as to meet the more specific and accurate communication demands of the user.

In the embodiment of the present application, it is not required that the personal information provided by the user and the peer information selected by the user are identical. For example, the personal information provided by the user may be age information, but the peer information selected by the user may be other information such as residence information or interest information, instead of the age information. Accordingly, the user matching method provided by the embodiment of the present application fully considers the demands for difference between users, and thus the users may easily find mutual interests. By the user matching method provided by the embodiment of the present application, the user can obtain a better choice and identification capability when selecting a to-be-communicated object.

Further, in the user matching method provided by the embodiment of the present application, according to the information peer interchange principle, one piece of information of the current user may exchange for one piece of information of the recommended user, so as to implement fair information exchange between users, protect the privacy of the users to some degree, and establish effective communication and trust.

The subsequent processing of the method provided by this embodiment is similar to the embodiments shown in FIGS. 5 and 6, and thus will not be illustrated in detail. For example, the method provided by this embodiment may further include determining the category of the second personal information according to the contents of the second personal information, and label and store the category of the second personal information. In addition, the feedback information of the recommended user may further include evaluation information of the second personal information. The evaluation information may also be taken as a factor for determining the recommendation level of the current user.

Figure 8:
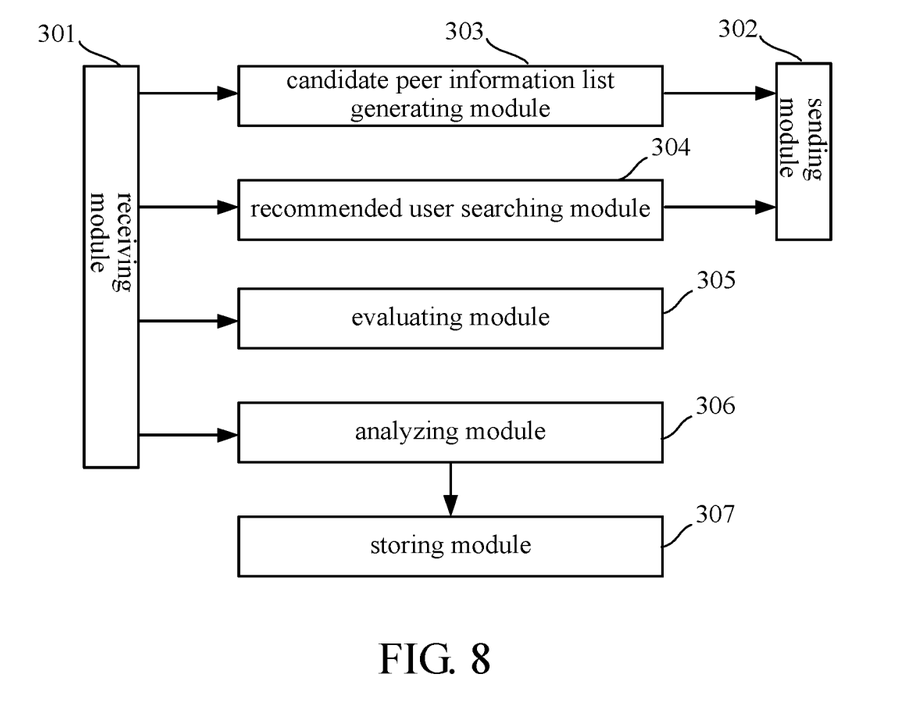
FIG. 8 is a diagram illustrating the structure of a user matching apparatus according to an embodiment of the present application.

An embodiment of the present application provides a user matching apparatus, which may run in the server 200 shown in FIG. 1 and is used for implementing the user matching method described in the above embodiments. As shown in FIG. 8, the apparatus includes a receiving module 301, a sending module 302, a candidate peer information list generating module 303, a recommended user searching module 304, an evaluating module 305, an analyzing module 306 and storing module 307.

The receiving module 301 may receive information sent by users, for example, receive personal information, peer information and feedback information sent by the users via terminal devices. Specifically, the receiving module 301 may receive first personal information sent by a current user and at least one piece of first peer information selected by the current user from a first candidate peer information list.

The sending module 302 may provide information sent by the user matching apparatus to the users, for example, provide a candidate peer information list and a recommended user list to the users. Specifically, the sending module 302 may send the first candidate peer information list and information of a recommended user to the current user.

When the receiving module 301 receives the personal information sent by the current user, the candidate peer information list generating module 303 may generate the candidate peer information list according to the personal information, and provide the candidate peer information list to the current user via the sending module 302.

The current user may send multiple pieces of personal information to the user matching apparatus of the server 200. Every time the receiving module 301 receives one piece of personal information, the candidate peer information list generating module 303 provides a candidate peer information list to the current user, so that the current user may select at least one piece of peer information corresponding to the personal information.

For example, when the receiving module 301 receives the first personal information sent by the current user, the candidate peer information list generating module 303 provides the first candidate peer information list to the current user according to the first personal information. The candidate peer information in the first candidate peer information list may include, but is not limited to, physical information, age information, work information, family information, residence information and interest information. The current user may select at least one piece of first peer information from the first candidate peer information list. If the current user intends to provide another piece of personal information, the current user may edit second personal information and send it to the server 200. The second personal information is different from the first personal information. The receiving module 301 receives the second personal information sent by the current user, the candidate peer information list generating module 303 provides a second candidate peer information list to the current user according to the second personal information. The candidate peer information in the second candidate peer information list may include, but is not limited to, physical information, age information, work information, family information, residence information and interest information. The candidate peer information in the second candidate peer information list may be the same as or different from that in the first candidate peer information list. Similarly, the current user may select at least one piece of second peer information from the second candidate peer information list. The at least one piece of second peer information and the at least one piece of first peer information selected from the first candidate peer information list may the same, overlap or different from each other.

The recommended user searching module 304 may search for a recommended user according to an information peer exchange principle, and provide the recommended user list to the current user via the sending module 302. The information peer exchange principle includes that the personal information of the recommended user matches with the at least one piece of first peer information selected by the current user, and first personal information matches with at least one piece of first peer information selected by the recommended user.

When the receiving module 301 receives the at least one piece of peer information selected from the candidate peer information list by the current user, the personal information of the recommended user found by the recommended user searching module 304 matches with the at least one piece peer information selected by the current user, and the personal information of the current user matches with the at least one piece of peer information selected by the recommended user.

In an embodiment of the present application, the current user provides one piece of personal information and selects at least one piece of peer information of a to-be-communicated user. The recommended user searching module 304 searches for a suitable user according to the personal information and the peer information provided by the current user, and recommends the found user to the current user. In an embodiment of the present application, the recommended user searching module 304 may generate a recommended user list according to all found recommended users.

For example, the personal information submitted by the current user is "I live in Shanghai" and the peer information selected by the current user is "age information". If the recommended user searching module 304 finds that the personal information provided by a user is "I'm 28 years old" and the peer information selected by the user is "residence information", the recommended user searching module 304 determines that the user is a recommended user, and adds the user to the recommended user list.

For another example, the personal information submitted by the current user is "I live in Shanghai" and two pieces of peer information selected by the current user is "age information" and "interest information". If the recommended user searching module 304 finds that the personal information provided by a user A is "I'm 28 years old" and the peer information selected by the user A is "residence information", the recommended user searching module 304 determines that the user A is a recommended user, and adds the user A to the recommended user list. If the recommended user searching module 304 finds that the personal information provided by a user B is "I like karaoke" and the peer information selected by the user B is "residence information" or "work information", the recommended user searching module 304 determines that the user B is a recommended user, and adds the user B to the recommended user list. If the recommended user searching module 304 finds that the personal information provided by a user C is "I like karaoke" and "I'm 28 years old" and a piece of peer information selected by the user C is "residence information", the recommended user searching module 304 determines that the user C is a recommended user, and adds the user C to the recommended user list.

The receiving module 301 receives multiple pieces of personal information of the current user and multiple pieces of peer information corresponding to the multiple pieces of personal information. For example, the receiving module 301 receives first personal information, second personal information of the current user, at least one piece of first peer information selected from the first candidate peer information list and at least one piece of second peer information selected from the second candidate peer information list. In this case, the recommended user searching module 304 searches for the recommended user and generates the recommended user list. According to the first personal information and the second personal information provided by the current user and the information peer exchange principle, the personal information of the recommended user matches with the at least one piece of first peer information selected by the current user, and first personal information of the current user matches with at least one piece of first peer information selected by the recommended user; the personal information of the recommended user matches with the at least one piece of second peer information selected by the current user, and the second personal information of the current user matches with at least one piece of second peer information selected by the recommended user.

For example, if the current user provides first personal information x and second personal information u respectively, selects two pieces of first peer information y and z for the first personal information x, and selects two pieces of second peer information v and w for the second personal information u. The x, y, z, u, v and w may be, but are not limited to, physical information, age information, work information, family information, residence information and interest information.

If the recommended user searching module 304 finds that the first personal information provided by the user includes y or z, the first peer information selected by the user includes x, the second personal information provided by the user includes v or w and the second peer information selected by the user includes u, the recommended user searching module 304 determines that the user is a recommended user, and adds the user to the recommended user list. That is, four categories of users may be taken as recommended users. The first personal information provided by a first category of users includes y, the first peer information selected by the first category of users includes x, the second personal information provided by the first category of users incudes v, and the second peer information selected by the first category of users includes u. The first personal information provided by a second category of users includes y, the first peer information selected by the second category of users includes x, the second personal information provided by the second category of users incudes w, and the second peer information selected by the second category of users includes u. The first personal information provided by a third category of users includes z, the first peer information selected by the third category of users includes x, the second personal information provided by the third category of users incudes v, and the second peer information selected by the third category of users includes u. The first personal information provided by a fourth category of users includes z, the first peer information selected by the fourth category of users includes x, the second personal information provided by the fourth category of users incudes w, and the second peer information selected by the fourth category of users includes u.

For another example, if the user provides first personal information x and second personal information u respectively, selects two pieces of first peer information y and z for the first personal information x, and selects two pieces of second peer information y and v for the second personal information u. That is, one piece of second peer information is the same as one piece of first peer information.

If the recommended user searching module 304 finds that the first personal information provided by the user includes y or z, the first peer information selected by the user includes x, the second personal information provided by the user includes y or v, and the second peer information selected by the user includes u, the recommended user searching module 304 determines that the user is a recommended user, and adds the user to the recommended user list. If it is required that the first personal information provided by the user cannot be the same as the second personal information, three categories of users may be taken as recommended users. The first personal information provided by a first category of users includes y, the first peer information selected by the first category of users includes x, the second personal information provided by the first category of users incudes v, and the second peer information selected by the first category of users includes u. The first personal information provided by a second category of users includes z, the first peer information selected by the second category of users includes x, the second personal information provided by the second category of users incudes y, and the second peer information selected by the second category of users includes u. The first personal information provided by a third category of users includes z, the first peer information selected by the third category of users includes x, the second personal information provided by the third category of users incudes v, and the second peer information selected by the third category of users includes u.

The evaluating module 305 may determine a recommendation level of the current user according to the evaluation information of the recommended user for the current user. For example, after receiving the recommended user list, the current user selects a to-be-matched (for example, adds a friend and follows) recommended user from the recommended user list, and sends a matching request to the server 200. The matching request includes information of the recommended user selected from the recommended user list by the current user. The current user may select at least one recommended user to perform a matching operation. After the receiving module 301 receives the matching request sent by the current user, the sending module 302 provides information about whether the matching request sent by the current user is accepted to the recommended user selected by the current user. After the recommended user receives the information about whether the matching request sent by the current user is accepted and evaluates the current user, the recommended user sends feedback information to the server 200 via a terminal device (for example, the second terminal device 103 shown in FIG. 1). The feedback information includes information indicating to accept or not to accept the matching request sent by the current user. For example, if the recommended user selected by the current user approves the matching operation, the feedback information indicates to accept the matching request sent by the current user; otherwise, the feedback information indicates not to accept the matching request sent by the current user. If the feedback information that is sent by the recommended user selected by the current user indicates to accept the matching request sent by the current user, the server 200 performs the matching operation between the current user and the recommended user.

The feedback information may further include evaluation information performed on the personal information of the current user by at least one recommended user among the recommended users selected by the current user. The evaluation information may be an evaluation performed on the truth of the contents of the personal information provided by the current user. After the receiving module 301 receives the evaluation information, the evaluation module 305 may take the evaluation information as a factor for determining a recommendation level of the current user. For example, when the current user is recommended to other users by the server 200, the current user is more likely to appear high in the recommended user list if the truth degree of the personal information provided by the current user is higher in the evaluation information provided by the recommended user and the number of recommended users evaluating the personal information as truth is larger.

The analyzing module 306 may analyze the personal information received by the receiving module 301, for example, analyze the first and second personal information, and determine the category of the personal information according to the contents of the personal information. For example, if the contents of the personal information are "I live in Shanghai", the analyzing module 306 may determine that the category of the personal information is residence information. If the contents of the personal information are "I am 18 years old", the analyzing module 306 may determine that the category of the personal information is age information.

After the analyzing module 306 analyzes the personal information of the current user, the storing module 307 labels and stores the category of the personal information of the current user. In this way, when searching for a to-be-communicated object, another user may determine rapidly whether the current user may be taken as a recommended user according to the peer information selected by the current user and the category of the personal information provided by the current user. For example, the personal information provided by the current user is "I am 18 years old", the analyzing module 306 determines that the personal information is age information, and the storing module 307 labels and stores the category of the personal information. When another user searches for a to-be-communicated object and the peer information selected by the current user includes age information, the recommended user searching module 304 may rapidly find the current user according to the labeled and stored category of the personal information, and further determine whether the current user may be taken as the recommended user. In this way, the recommended user searching module 304 may save time and determination programs for searching for the recommended user.

By the user matching method and apparatus provided by the embodiments of the present application, the user may select at least one piece of peer information from the candidate peer information list after providing one piece of personal information, so as to acquaint with a to-be-communicated object. The server may provide the recommended user list to the user according to the peer information provided by the user, so as to meet the more specific and accurate communication demands of the user.

In the embodiments of the present application, it is not required that the personal information provided by the user and the peer information selected by the user are identical. For example, the personal information provided by the user may be age information, but the peer information selected by the user may be other information such as residence information or interest information, instead of the age information. Accordingly, the user matching method and apparatus provided by the embodiments of the present application fully consider the demands for difference between users, and thus the users may easily find mutual interests. By the user matching method and apparatus provided by the embodiments of the present application, the user can obtain a better choice and identification capability when selecting a to-be-communicated object.

Further, in the user matching method and apparatus provided by the embodiments of the present application, a satisfied user is searched for according to an information peer exchange principle and is determined as a recommended user. One piece of information of the current user may exchange for one piece of information of the recommended user, so as to implement fair information exchange between users, protect the privacy of the users to some degree, and establish effective communication and trust.

It should be noted that, the embodiments of the present application are described progressively. The description emphases of an embodiment are different from those of another embodiment. The same or similar parts of the embodiments may be referred to each other. The technical solution of the apparatus embodiments is similar to that of the method embodiments, and thus is described briefly, which may refer to related descriptions of the method embodiments.

It should be noted that, the terms "first" and "second" described in the specification are only used to distinguish one object or operation from another object or operation, but do not require or hint a specific relation or order among these objects or operations. The term "includes", "comprises" or any other substitution means "includes but not limited to", so that processes, methods, articles or apparatuses including a serious of elements not only include those elements, but also include other elements which are not listed explicitly, or include fixed elements of these processes, methods, articles or apparatuses. If there is no more limits, elements limited by the sentence "include a . . . " may include other identical elements in the processes, methods, articles or apparatuses including the elements.

Those skilled in the art can understand that all or part of steps in the above embodiments can be implemented by hardware or by instructing related hardware by a program.

The program may be stored in a computer readable storage medium and the storage medium may be a ROM, a disk or a Compact Disc (CD).

The foregoing is only embodiments of the present application and is not used to limit the present application in any form. Though the embodiments of the present application have been described as mentioned above, the embodiments of the present application are not used to limit the present application. Within the protection scope of the present invention, those skilled in the art may obtain equivalent embodiments through making equivalent substitutions such as some improvements or modifications according to the above described technology matter. Any simple improvement, equivalent substitution and modification made on the above embodiments according to the technical matter of the present application, without departing from the technical solution contents of the present application, are within the protection scope of the present application.

What is claimed is:

1. A user matching method, the method comprising:
   generating, by a first terminal device, first personal information of a current user by editing character information on the first terminal device, recording voice information on the first terminal device, or taking pictures or shooting videos by the first terminal device, and sending the first personal information of the current user to a server via a network;
   receiving, by the server, the first personal information of the current user from the first terminal device via the network;
   generating, by the server, a first candidate peer information list according to the first personal information and sending the first candidate peer information list to the first terminal device, wherein the first terminal device displays the first candidate peer information list through a display screen for the current user;
   receiving, by the server from the first terminal device, multiple pieces of first peer information selected by the current user from the first candidate peer information list;
   searching, by the server, for a recommended user according to an information peer exchange principle, wherein the information peer exchange principle comprises that personal information of the recommended user matches with one of the multiple pieces of first peer information selected by the current user, and the first personal information matches with at least one piece of first peer information selected by the recommended user;
   sending, by the server, information of the recommended user to the first terminal device via the network; and
   when at least two pieces of the personal information of the recommended user match two of the multiple pieces of first peer information selected by the current user, requesting, by the server, the first terminal device to select and view only one piece from the at least two pieces of the personal information of the recommended user, as an exchange for providing the first personal information of the current user, wherein the recommended user is a user that has sent a selection request to the server to view the first personal information of another user as an exchange for providing one of the two pieces of the first peer information, and the two pieces of the first peer information are obtained by at least one of editing character information on a second terminal device, recording voice information on the second terminal device, or taking pictures or shooting videos by the second terminal device; wherein
   the method further comprises:
   receiving, by the server, feedback information from the second terminal device that is used by the recommended user selected by the current user, wherein the feedback information comprises evaluation information performed on the first personal information of the current user by at least one recommended user among the recommended users selected by the current user, and the evaluation information is an evaluation performed on truth of the first personal information of the current user; and
   determining, by the server, a recommendation level of the current user according to the evaluation information, the higher the truth degree of the first personal information of the current user is and the larger the number of recommended users evaluating the first personal information as truth is, the greater likeliness of the current user being recommended to other users is.

2. The method of claim 1, further comprising:
   generating, by the server, a recommended user list according to found recommend user and sending the recommended user list to the first terminal device;
   receiving, by the server, a matching request sent by the first terminal device, wherein the matching request comprises information of a recommended user selected by the current user from the recommended user list; and
   sending, by the server to the second terminal, information about whether the matching request sent by the first terminal device is accepted.

3. The method of claim 2, wherein the feedback information comprises information indicating to accept or not to accept the matching request sent by the first terminal device.

4. The method of claim 1, further comprising:
   receiving, by the server, second personal information sent by the first terminal device when receiving the multiple pieces of first peer information selected by the current user from the first candidate peer information list;
   sending, by the server, a second candidate peer information list to the first terminal device according to the second personal information; and
   receiving, by the server from the first terminal device, at least one piece of second peer information selected by the current user from the second candidate peer information list.

5. The method of claim 4, wherein the information peer exchange principle further comprises that the personal information of the recommended user matches with the at least one piece of second peer information selected by the current user, and the second personal information matches with at least one piece of second peer information selected by the recommended user.

6. The method of claim 1, further comprising:
   determining, by the server, a category of the first personal information according to contents of the first personal information; and
   labeling and storing, by the server, the category of the first personal information.

7. The method of claim 4, further comprising:
   determining, by the server, a category of the second personal information according to contents of the second personal information; and
   labeling and storing, by the server, the category of the second personal information.

8. A user matching apparatus comprising:
   a processor and a non-transitory storage, wherein the non-transitory storage stores one or more computer readable instructions, and the processor executes the computer readable instructions stored in the non-transitory storage to:

receive first personal information of a current user from a first terminal device via a network, wherein the first personal information of the current user is generated by the first terminal device, by editing character information on the first terminal device, recording voice information on the first terminal device, or taking pictures or shooting videos by the first terminal device;

generate a first candidate peer information list according to the first personal information and send the first candidate peer information list to the first terminal device, wherein the first terminal device displays the first candidate peer information list through a display screen for the current user;

receive, from the first terminal device, multiple pieces of first peer information selected by the current user from the first candidate peer information list;

search for a recommended user according to an information peer exchange principle, wherein the information peer exchange principle comprises that personal information of the recommended user matches with one of the multiple pieces of first peer information selected by the current user, and the first personal information matches with at least one piece of first peer information selected by the recommended user;

send information of the recommended user to the first terminal device via the network; and when at least two pieces of the personal information of the recommended user match two of the multiple pieces of first peer information selected by the current user, request the first terminal device to select and view only one piece from the at least two pieces of the personal information of the recommended user, as an exchange for providing the first personal information of the current user, wherein the recommended user is a user that has sent a selection request to the server to view the first personal information of another user as an exchange for providing one of the two pieces of the first peer information, and the two pieces of the first peer information are obtained by at least one of editing character information on a second terminal device, recording voice information on the second terminal device, or taking pictures or shooting videos by the second terminal device; wherein the processor further executes the computer readable instructions stored in the non-transitory storage to:

receive feedback information from the second terminal device that is used by the recommended user selected by the current user, wherein the feedback information comprises evaluation information performed on the first personal information of the current user by at least one recommended user among the recommended users selected by the current user, and the evaluation information is an evaluation performed on truth of the first personal information of the current user; and determine a recommendation level of the current user according to the evaluation information, the higher the truth degree of the first personal information of the current user is and the larger the number of recommended users evaluating the first personal information as truth is, the greater likeliness of the current user being recommended to other users is.

9. The apparatus of claim 8, wherein the processor further executes the computer readable instructions stored in the non-transitory storage to generate a recommended user list according to found recommend user and send the recommended user list to the first terminal device;

receive a matching request sent by the first terminal device, wherein the matching request comprises information of a recommended user selected by the current user from the recommended user list; and send to the second terminal device information about whether the matching request sent by the first terminal device is accepted.

10. The apparatus of claim 8, wherein the processor further executes the computer readable instructions stored in the non-transitory storage to:

receive second personal information sent by the first terminal device when receiving the multiple pieces of first peer information selected by the current user from the first candidate peer information list;

send a second candidate peer information list to the first terminal device according to the second personal information; and receive, from the first terminal device, at least one piece of second peer information selected by the current user from the second candidate peer information list.

11. The apparatus of claim 10, wherein the information peer exchange principle comprises that the personal information of the recommended user matches with the at least one piece of second peer information selected by the current user, and the second personal information matches with at least one piece of second peer information selected by the recommended user.

12. The apparatus of claim 8, wherein the processor further executes the computer readable instructions stored in the non-transitory storage to determine a category of the first personal information according to contents of the first personal information; and label and store the category of the first personal information.

13. A non-transitory computer readable storage medium, configured to storing one or more computer program instructions, which are executed by a computer to implement a process of:

receiving first personal information of a current user from a first terminal device via a network, wherein the first personal information of the current user is generated by the first terminal device, by editing character information on the first terminal device, recording voice information on the first terminal device, or taking pictures or shooting videos by the first terminal device;

generating a first candidate peer information list according to the first personal information and sending the first candidate peer information list to the first terminal device, wherein the first terminal device displays the first candidate peer information list through a display screen for the current user;

receiving, from the first terminal device, multiple pieces of first peer information selected by the current user from the first candidate peer information list;

searching for a recommended user according to an information peer exchange principle, wherein the information peer exchange principle comprises that personal information of the recommended user matches with one of the multiple pieces of first peer information selected by the current user, and the first personal information matches with at least one piece of first peer information selected by the recommended user;

sending information of the recommended user to the first terminal device via the network; and when at least two pieces of the personal information of the recommended user match two of the multiple pieces of first peer information selected by the current user, requesting the first terminal device to select and view only one piece from the at least two pieces of the personal information of the recommended user, as an exchange for providing the first personal information of the current user, wherein the recommended user is a user that has sent a selection request to the server to view the first personal information of another user as an exchange for providing one of the two pieces of the first peer information, and the two pieces of the first peer information are obtained by at least one of editing character information on a second terminal device, recording voice information on the second terminal device, or taking pictures or shooting videos by the second terminal device; wherein the one or more computer program instructions further cause the computer to implement:

receiving feedback information from the second terminal device that is used by the recommended user selected by the current user, wherein the feedback information comprises evaluation information performed on the first personal information of the current user by at least one recommended user among the recommended users selected by the current user, and the evaluation information is an evaluation performed on truth of the first personal information of the current user; and determining a recommendation level of the current user according to the evaluation information, the higher the truth degree of the first personal information of the current user is and the larger the number of recommended users evaluating the first personal information as truth is, the greater likeliness of the current user being recommended to other users is.

14. The storage medium of claim 13, wherein the computer program instructions further cause the computer to implement:

generating a recommended user list according to found recommend user and sending the recommended user list to the first terminal device;

receiving a matching request sent by the first terminal device, wherein the matching request comprises information of a recommended user selected by the current user from the recommended user list; and sending, to the second terminal, information about whether the matching request sent by the first terminal device is accepted.

15. The storage medium of claim 14, wherein the feedback information comprises information indicating to accept or not to accept the matching request sent by the first terminal device.

16. The storage medium of claim 13, wherein the computer program instructions further cause the computer to implement:

receiving second personal information sent by the first terminal device when receiving the multiple pieces of first peer information selected by the current user from the first candidate peer information list;

sending a second candidate peer information list to the first terminal device according to the second personal information; and receiving, from the first terminal device, at least one piece of second peer information selected by the current user from the second candidate peer information list.

17. The storage medium of claim 16, wherein the information peer exchange principle further comprises that the personal information of the recommended user matches with the at least one piece of second peer information selected by the current user, and the second personal information matches with at least one piece of second peer information selected by the recommended user.

* * * * *